INVENTOR.
HERBERT HAAS
EDMUND MUNK
GERT WEINBERG

ATTORNEYS

Nov. 21, 1967  H. HAAS ET AL  3,354,248
PROCESS AND MACHINE FOR PRODUCING MULTIDIMENSIONALLY
MOLDED ARTICLES
Filed June 8, 1965  2 Sheets-Sheet 2

INVENTOR.
HERBERT HAAS
EDMUND MUNK
GERT WEINBERG
ATTORNEYS

United States Patent Office 3,354,248
Patented Nov. 21, 1967

3,354,248
PROCESS AND MACHINE FOR PRODUC-
ING MULTIDIMENSIONALLY MOLDED
ARTICLES
Herbert Haas, Edmund Munk, and Gert Weinberg, Ober-
stenfeld, Wurttemberg, Germany, assignors to Furnier-
und Sperrholzwerk J. F. Werz, Jr., K.G., Werzalit-
Pressholzwerk, Oberstenfeld, Wurttemberg, Germany
Filed June 8, 1965, Ser. No. 462,365
9 Claims. (Cl. 264—119)

ABSTRACT OF THE DISCLOSURE

A two-step process for forming molded articles wherein the first step partially forms the article, particularly the corners, and the second step completes the formation of the article without materially altering the measurement of the angles forming the corners of the article. More specifically, square corners are preformed in the article with a curvature being formed at the same time in that portion of the article which will become flattened during the second step of molding. This is shown in FIGURES 1 and 2.

This invention is directed to a process for producing molded articles having relatively thin walls and being molded in two or three dimensions with relatively acute transition from one dimension to the other between the walls. More specifically, this invention relates to a two-step process for forming molded articles wherein the first step partially forms the article, particularly the transition from one dimension to the other, and the second step completes the formation of the article without materially altering the measurement of the angles forming the transition from one dimension to the other between the walls of the article.

It is a known art that open, hollow articles as well as U-shaped, molded parts composed of organic fibrous matter and an adhesive can be compressed by a female die and a male die so long as the interior angles of the parts at the transitions from one dimension to the other at the wall sections are relatively large. This is required to insure a fairly even distribution of the furnish and the application of adequate pressure during the press cycle to lend the necessary strength to all areas of the article. Such conventional compression assumes a critical aspect in the presence of an interior angle measuring less than 125°. Yet, there is a demand for molded hollow articles open on one side as well as U-shaped molded articles, such as containers, having an interior angle of 90 to 100°. The conventional method fails in the manufacture of such articles because it becomes necessary for the production of multi-dimensional molded articles with relatively acute transitions to use press dies which apply lateral pressure by means of slides. However, the cost of such dies amounts to several times that of dies composed of female and male parts. Moreover, their operation is trouble-prone; it takes much longer to build them; they are more complicated to operate; and their wear and tear is much greater than that of other dies. On the other hand, when presses with lateral slides are used, the transitions from one to the other dimension between the walls remain relatively weak because their fiber structure of the finished article is not uniform in those areas.

In accordance with this invention, a preform is initially formed from comminuted organic fiber matter and an adhesive in a first press cycle in the dimensions of the finished article. The finished article may have two or three dimensions, such as a container or a U-shaped member having selected angles between the dimensions. In the first press cycle, one of the dimensions of the preform is contoured such that the respective angle between one dimension and the other provides the preform with a minimum of slope between the preform and a second press surface. Such a condition insures maximum uniformity in compressing the preform in a second press cycle to the final shape without essentially altering the angle between one dimension and the other while forming the contoured dimension of the preform to the noted surface of the second press.

With this invention, the preform is designed so that the interior angles of the preform from one dimension to the other approximate the interior angles of the finished product, with the areas of the individual dimensions being quite level with that of the press surface. This is accomplished by insuring that the areas of the dimension which are parallel to the press surface during the press cycle are uniformly curved so that the corners of the preform at the transition to the other dimension will be practically the same as the corners of the finished article. The curve must be limited to a curve which can be pressed flat in the second press cycle without breaking. The transition area of the preform must match the transition of the prefinished product to a maximum, because the small radius of the transition in that area does not allow for major remolding in the second press cycle without causing the article to break in that area. The process of this invention makes it possible solely by using a female die and a male die to press hollow articles open on one side or U-shaped molded parts so that the interior angle formed by the areas may be as small as 90°. The flat design of the preform allows for ready felting of the furnish on the female die.

A set of press dies composed merely of a female part and a male part can be built quickly and cheaply. They are reliable, require little maintenance and allow for a maximum volume of production before they are worn out. This materially enhances the economy of the process for producing multidimensional molded articles with thin walls and sharp angles between the transition areas of the walls of the article. The fact that the interior angles of the various faces of the preform practically match those of the finished article requires but minor changes to be made in the structure of the preform in the course of the second press cycle. This makes for greater strength in the corner areas, an essential factor when the end use of the article is considered.

In order to fully understand the merits of the present invention, reference is made to the drawings wherein.

Figure 1:
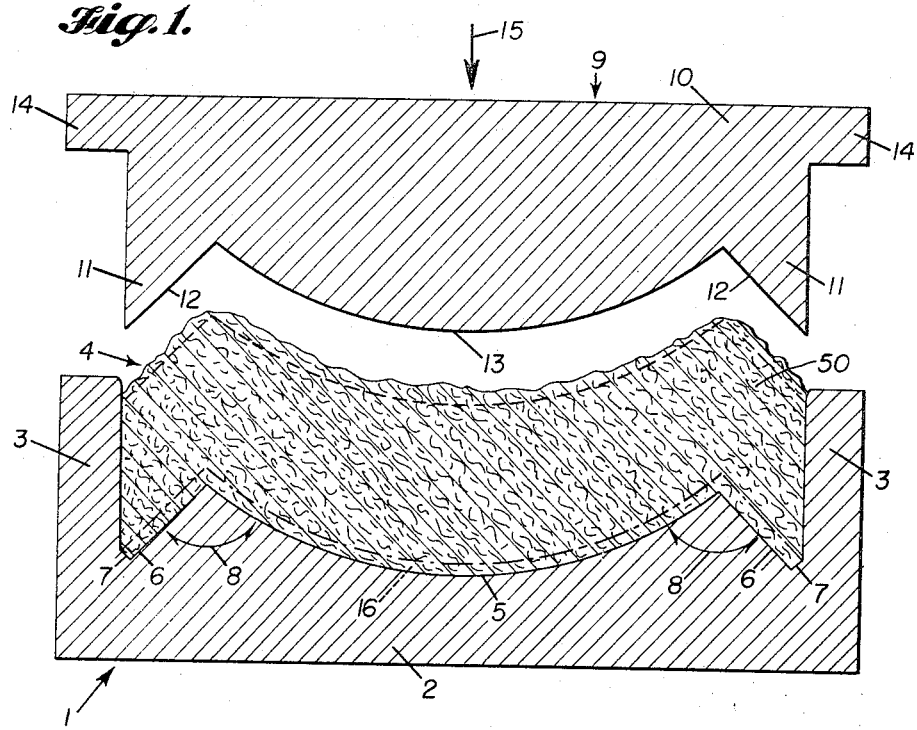
FIGURE 1 is a cross sectional view of a male and female die for forming the preform.

Referring to FIGURE 1 of the drawings, a preform mold is disclosed which includes a female mold 1 having a base portion 2 and side walls 3 to form a cavity 4 therein. The upper portion of the base 2 is provided with an arcuate surface 5 that intersects with downwardly and outwardly sloping surfaces 6. The angle that extends between the arcuate surface 5 and downwardly and outwardly extending surfaces 6 may range between 90 to 100°. The surface 5 must be limited to a curve which can be pressed flat in the second press cycle without breaking and will be of a size equal to the dimension of the bottom wall of the finished article. Accordingly, the radius of the arcuate surface 5 may range between 100″ and 10″. The lower portion of the downwardly and outwardly extending surfaces 6 intersect a surface 7 at right angles thereto that extend upwardly and outwardly to square off the edge of the article being formed. The portion 7 intersects the side walls 3 of the cavity which are vertical.

A male die 9 is provided having a body portion 10 with flanges 14 on the upper end thereof. The lower portion of the body 10 is provided with an arcuate surface 13 which coincides with the surface 5 on the female die 1. The surface 13 intersects projection 11 thereon having surfaces 12 which coincide with the surfaces 6 on a female die. Accordingly, the angle that is formed between the surfaces 12 and 13 is identical with the angle 8 on the female die 1.

In use of the preformed die of FIGURE 1, the furnish indicated at 50 is placed into the cavity 4 of the female die 1. The furnish may be hand filled or machine filled into the cavity. The furnish may consist of comminuted wood fibers having an adhesive binder mixed therewith. Suitable binders may include urea formaldehyde, phenol formaldehyde, melamine formaldehyde, in an amount sufficient to fully form a rigid article upon application of heat and pressure. The amount of furnish placed into the cavity 4 may be a volumetric ratio of from 1:2 to 1:20 of the volume of the finished article.

The male die 9 is inserted into the female die and force is applied as indicated by arrow 15 until flange 14 abuts the upper end of walls 3 to compress the furnish 50 at a pressure of from 70 to 7000 p.s.i. for from 0.1 to 30 minutes. The uncured article 16 formed by this cold compression is provided with the requisite angle between the side walls and the bottom wall which are in an arcuate position. This angle, when subjected to heat and pressure upon a conventional male and female die, will not be altered as hereinafter set forth.

Figure 2:
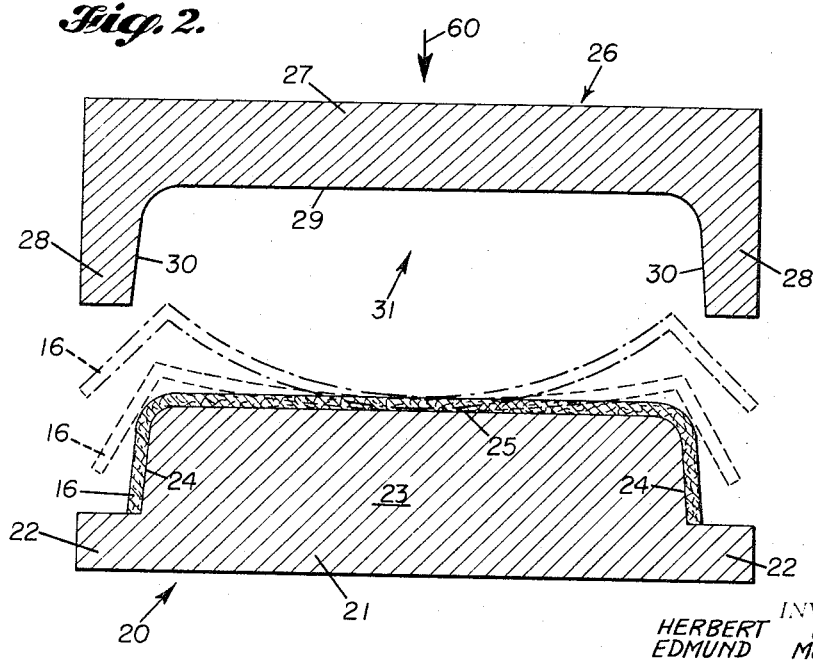
FIGURE 2 is a cross sectional view of male and female dies for finishing the molded article.

The article 16 is removed from the female die 1 and placed upon a male die 20, as shown in FIGURE 2, having a body portion 21 and flanges 22. A body portion 21 is provided with a projection 23 having a flat surface 25 thereon and side surfaces 24. The angle made between the upper surface 25 and side surfaces 24 is identical with the angle 8 as shown in FIGURE 1. When the article 16 is first placed upon the surface 25, the outer walls that were formed by surfaces 6 extend upwardly and away from the surface 24 of the male die as shown in phantom lines.

As shown in FIGURE 2, the upper female mold 26 is provided with a base portion 27 and side walls 28 forming a cavity 31. The female mold 26 is provided with a plane surface 29 and side wall surfaces 30. The angle of the side wall 30 coincides with the angle 24 on the male portion of the die. Accordingly, when the female mold 26 is telescoped over the projection 23 of the male mold, the article 16 is pushed down, as shown in phantom lines in FIGURE 2, to the position shown in FIGURE 2. The male and female molds are pushed down as indicated by the arrow 60 in FIGURE 2 until the lower end of the walls 28 abut the flanges 22. When the male and female molds 20 and 26 are in the fully closed position, the article 16 will be fully cured. In accordance with conventional practices, the male and female molds 20 and 26 are heated to a temperature preferably between 200° F. to 400° F. for from 0.1 to 10 minutes.

Figure 3:
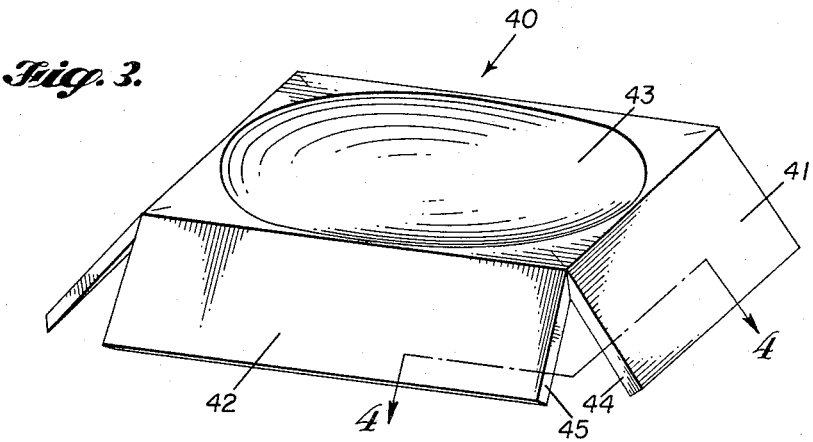
FIGURE 3 is a perspective view of a three-dimensional article made in accordance with this invention.
Figure 4:
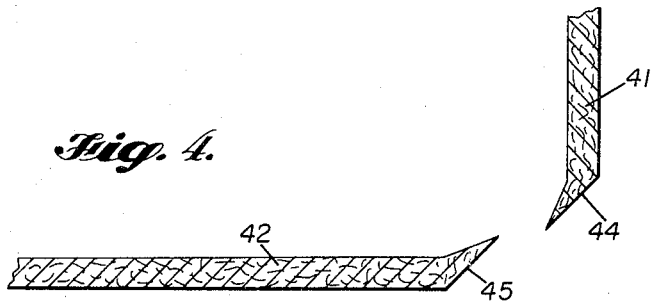
FIGURE 4 is a cross sectional view taken on line 4—4 of FIGURE 3.

Referring now to FIGURES 3 and 4, a three-dimensional container is disclosed which is formed in the same manner as noted above with respect to the U-shaped member disclosed in FIGURES 1 and 2. It is apparent that a different type or design of a male and female die must be employed to provide for the walls 41 and 42. As shown, the three-dimensional article 40 is provided with a bottom wall 43 which is provided with the curved or arcuate portion extending downwardly into the container when cold pressed in the preform dies. The article 40 is provided with walls 41 and walls 42 that form the requisite angle between the arcuate portion 43 and the sides 41 and 42. In this instance, the dies must be modified to provide a bevel portion 44 and 45 on the walls 41 and 42 to provide for closing of the article in its finished condition. Referring to FIGURE 4, a detailed cross section is shown of the container or finished article wherein the wall 41 is provided with a bevel portion 44 and the wall 42 is provided with a bevel portion 45. Accordingly, when the container 40 is placed into the heated dies to fully cure the same, the portion 45 will slide adjacent the portion 44 and will be held in the heated die until the same has been fully cured. By this expedient the corners between walls 41 and 42 are formed and are fully adhered to each other to form an article which is provided with the required strength characteristics.

It is apparent from the above description, that a three-dimensional article can be fully produced wherein the transition from one dimension to the other can be fully brought about by a simple male and female die without the use of lateral slides or additional heated dies. The angle between the bottom surface 43 of the article and the walls 41 and 42 may range from 90° to 100° as has been previously pointed out.

While specific details of a preferred embodiment have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. A process for producing molded articles having at least two dimensions with a relatively acute interior angle between one dimension and the other, said article being formed from a composition of comminute organic fibrous matter and a suitable adhesive, comprising:
   (a) filling the female die of a first set of male and female dies with a predetermined amount of said composition;
   (b) compressing, by co-action between said first set of dies said composition into a preform and forming an interior angle between one dimension and another of said preform, said angle being oriented to approximate the acute interior angle of the finished article; one dimension of said preform being contoured by compression between said first set of dies;
   (c) removing said preform from said first set of dies;
   (d) positioning said preform between a second set of male and female dies such that said contoured dimension of the preform slopes slightly away from its initial point of contact with the surface of the male die;
   (e) molding said preform in said second set of dies by heat and pressure to fully cure the adhesives and to conform said contoured dimension to the form of said male die surface without essentially altering said interior angle between one dimension and another;
   (f) removing said molded article from said second set of dies.

2. The process as set forth in claim 1 wherein one of the dimensions of said preform is an arcuate portion.

3. The process as set forth in claim 1 wherein the pressure for forming said preform may range between 70 and 7000 p.s.i.

4. The process as set forth in claim 1 wherein the pressure may range from 70 to 7000 p.s.i. to form said finished article in said heated dies.

5. The process as set forth in claim 1 wherein the pressure may be from 70 to 7000 p.s.i. to form said preform and said pressure may range from between 70 and 7000 p.s.i. to form said finished article in said heated dies.

6. The process as set forth in claim 1 wherein the temperature may range from between 200° F. and 400° F. in the heated dies to fully cure said finished article.

7. The process as set forth in claim 2 wherein the radius of said arcuate portion may range between 10″ and 100″.

8. The process as set forth in claim 2 wherein the radius of said arcuate portion may range between 10″ and 100″ and the pressure may range from between 70 and 7000 p.s.i. to form the preform and said pressure may range from between 70 and 7000 p.s.i. on said heated dies to fully cure said finished article.

9. The process as set forth in claim 2 wherein the radius of said arcuate portion may range between 10″ and 100″ and said pressure may range from between 70 and 7000 p.s.i. to form said preform and said pressure may range from between 70 and 7000 p.s.i. and at a temperature of between 200° F. and 400° F. on said preform to cure said finished article in said heated dies.

No references cited.

ROBERT F. WHITE, *Primary Examiner.*

J. R. HALL, *Assistant Examiner.*